US012497979B2

(12) United States Patent
Botkin et al.

(10) Patent No.: US 12,497,979 B2
(45) Date of Patent: Dec. 16, 2025

(54) CEILING FAN CANOPY MOUNTING ASSEMBLY

(71) Applicant: HUNTER FAN COMPANY, Memphis, TN (US)

(72) Inventors: Charles William Botkin, Cordova, TN (US); Bobby Neal Norwood, Oakland, TN (US); Douglas Troy Mason, Horn Lake, MS (US)

(73) Assignee: Hunter Fan Company, Memphis, TN (US)

( * ) Notice: Subject to any disclaimer, the term of this patent is extended or adjusted under 35 U.S.C. 154(b) by 188 days.

(21) Appl. No.: 17/381,112

(22) Filed: Jul. 20, 2021

(65) Prior Publication Data

US 2023/0025995 A1 Jan. 26, 2023

(51) Int. Cl.

| | |
|---|---|
| ***F04D 29/64*** | (2006.01) |
| ***F04D 3/00*** | (2006.01) |
| ***F16M 13/02*** | (2006.01) |

(52) U.S. Cl.

CPC ............. *F04D 29/646* (2013.01); *F04D 3/00* (2013.01); *F16M 13/027* (2013.01)

(58) Field of Classification Search

CPC ........ F04D 29/646; F04D 3/00; F04D 25/088; F04D 29/601; F16M 13/027

See application file for complete search history.

(56) References Cited

U.S. PATENT DOCUMENTS

| | | | | |
|---|---|---|---|---|
| 6,979,108 B1 * | 12/2005 | Berge | F21V 23/06 | 362/147 |
| 7,028,963 B1 * | 4/2006 | Silva | F04D 29/601 | 248/342 |
| 7,168,670 B2 | 1/2007 | Liang | | |
| 7,249,744 B2 | 7/2007 | Bacon et al. | | |
| 8,033,787 B1 * | 10/2011 | Miller | F04D 25/088 | 416/246 |
| 11,073,166 B2 * | 7/2021 | Gorali | F04D 29/601 | |
| 2006/0263224 A1 * | 11/2006 | Wang | F04D 25/088 | 416/244 R |
| 2008/0224013 A1 * | 9/2008 | Huang | F04D 29/646 | 248/343 |
| 2011/0031368 A1 | 2/2011 | Wang | | |
| 2015/0176604 A1 * | 6/2015 | Lin | F04D 19/002 | 248/343 |
| 2015/0345758 A1 * | 12/2015 | Highbridge | F21S 8/03 | 362/369 |

(Continued)

FOREIGN PATENT DOCUMENTS

| | | |
|---|---|---|
| EP | 0840015 A2 * | 6/1998 |
| WO | 2020232513 A1 | 11/2020 |

OTHER PUBLICATIONS

Hunter Fan Company Valda ceiling fan installation manual dated 2019 (Year: 2019).*

(Continued)

*Primary Examiner* — Terrell L Mckinnon
*Assistant Examiner* — Ding Y Tan
(74) *Attorney, Agent, or Firm* — McGarry Bair PC

(57) ABSTRACT

A ceiling fan assembly can include a motor for rotating one or more blades to drive a volume of air about a space. The ceiling fan assembly can include a ceiling fan mount with a canopy. The canopy can be received by a mounting bracket to enclose the mounting hardware near the ceiling.

16 Claims, 10 Drawing Sheets

(56) References Cited

U.S. PATENT DOCUMENTS

| | | | | |
|---|---|---|---|---|
| 2017/0175773 | A1* | 6/2017 | Mckee | F04D 29/644 |
| 2018/0127977 | A1* | 5/2018 | Voellmecke, III | F24F 13/20 |
| 2019/0113041 | A1* | 4/2019 | Walker, Jr. | F04D 25/088 |
| 2020/0063746 | A1* | 2/2020 | Botkin | F04D 29/34 |
| 2020/0400162 | A1 | 12/2020 | He et al. | |
| 2021/0004041 | A1 | 1/2021 | Qin et al. | |
| 2021/0048041 | A1* | 2/2021 | Gorali | F04D 25/088 |

OTHER PUBLICATIONS

Exhale Fans Europe online article titled "Fitting of an Exhale fan on false ceilings and uneven surfaces" date: Mar. 13, 2020 https://www.exhale-fans.com/en/fitting-of-an-exhale-fan-on-false-ceilings-and-uneven-surfaces/ (Year: 2020).*

Fanimation Accessory Ceiling Fan Sloped Ceiling Kit sold on amazon.com dated Jun. 14, 2017 https://www.amazon.com/Fanimation-SCK1-52GZ-Kit-1-inch-GZ-Kit-1-inch-Galvanized-Galvanized/dp/B071GSC19W (Year: 2017).*

* cited by examiner

CEILING FAN CANOPY MOUNTING ASSEMBLY

BACKGROUND

Ceiling fans are typically suspended from a structure for moving a volume of air about a space. The ceiling fan typically includes a motor, with a rotor and stator, downrod, canopy and blades, all secured to the structure by a mounting assembly that includes fasteners and brackets. The structure to which the ceiling fan is mounted is typically a ceiling where a canopy decoratively covers the mounting assembly.

BRIEF DESCRIPTION

In one aspect, the disclosure relates to a mounting system for supporting a ceiling fan assembly of the type having a motor, motor housing, a plurality of blades and a downrod to a support surface, the mounting system comprising a bracket configured to be mounted to the support surface, a canopy having a central opening, an inner surface, and a rim opposite the central opening, a variable height connector comprising at least one detent array, located on one of the bracket or canopy, the detent array having multiple detents in stacked arrangement, and at least one projection, extending from the other of the bracket or canopy, and receivable within any of the multiple detents.

DETAILED DESCRIPTION

Figure 1:
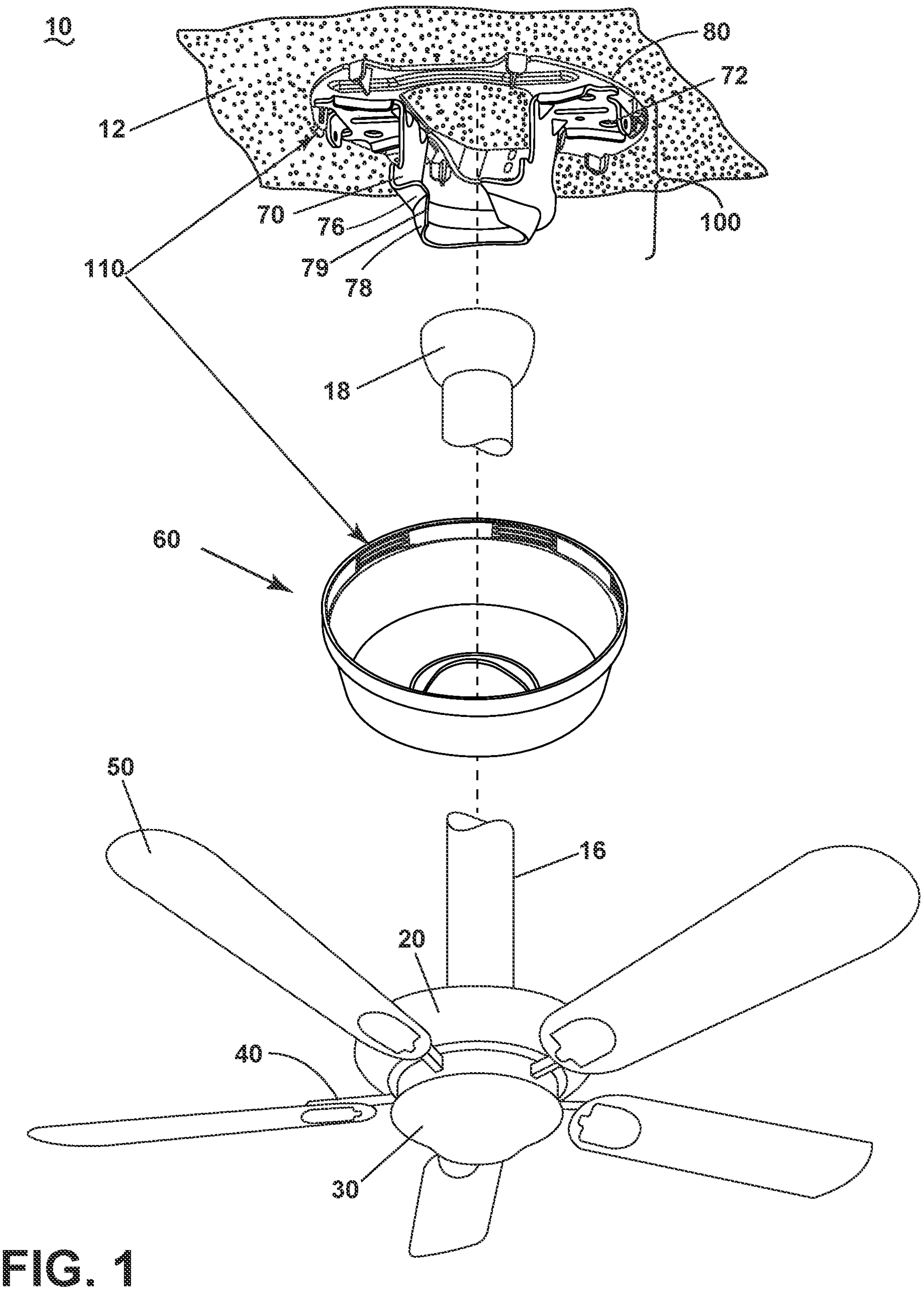
FIG. 1 is a bottom perspective, partially exploded view of a ceiling fan mounting assembly with a canopy, downrod, and fan. The perspective angle of the canopy is different from the overall perspective angle such that the interior of the canopy can be seen.

The disclosure is related to a ceiling fan mounting system, which can be used, for example, in residential, agricultural, industrial, and commercial applications. More specifically, this disclosure relates to a ceiling fan mounting system utilizing a variable height connector with a detent array and projection to accommodate the variable height. Such applications can be indoors, outdoors, or both. While this description is primarily directed toward a residential ceiling fan, it is also applicable to any environment utilizing fans or for cooling areas utilizing air movement.

As used herein, the term "set" or a "set" of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a ceiling fan assembly 10 is shown. In non-limiting examples, the ceiling fan assembly 10 can include one or more ceiling fan components including a ceiling fan mounting assembly 100, a downrod 16 with a hanger ball 18, a motor housing 20 at least partially encasing a motor (not shown) having a rotor and a stator (not shown), a light kit 30, a set of blade irons 40, a set of blades 50, and a canopy 60. The mounting assembly 100 comprises a hanger bracket 70 and a mounting plate 80. In additional non-limiting examples, the ceiling fan assembly 10 can include one or more of a controller, a wireless receiver, a light glass, a light cage, a spindle, a finial, a switch housing, blade forks, blade tips or blade caps, or other ceiling fan components.

At least one fan blade 50 can be carried by the rotor. For example, the at least one fan blade 50 can extend radially from the ceiling fan assembly 10, and can be rotatable to drive a volume of fluid such as air. That is, the at least one fan blade 50 can be operably coupled to the motor at the rotor, such as via the blade irons 40. The at least one fan blade 50 can include a set of blades 50, having any number of blades, including only one blade.

The structure 12 can be a ceiling, for example, from which the ceiling fan assembly 10 is suspended. It should be understood that the structure 12 is schematically shown and is by way of example only, and can include any suitable building, structure, home, business, or other environment wherein moving air with a ceiling fan is suitable or desirable. The structure 12 can also include an electrical supply (not shown) and can electrically couple to the ceiling fan assembly 10 to provide electrical power to the ceiling fan assembly 10 and motor. It is also contemplated that the electrical supply be sourced from somewhere other than the structure 12, such as a battery or generator in non-limiting examples.

The canopy 60 can couple to the ceiling fan mounting assembly 100. The canopy 60 can be a decorative cover to encase or hide at least a portion of the mounting assembly 100. The canopy 60 can slidably receive the downrod 16. When positioned, the canopy 60 can circumscribe the mounting assembly 100 and can fasten to at least the mounting plate 80 or the hanger bracket 70. The canopy 60 can secure to the mounting assembly 100 by means of a vertical height connector 110, defined among the canopy 60 and the mounting assembly 100.

Fasteners 72 couple the mounting plate 80 to the hanger bracket 70. Alternatively, the hanger bracket 70 can be integrally formed with the mounting plate. At least a portion of mounting plate 80 can abut the structure 12, therefore configuring the hanger bracket 70 to mount to the structure 12. The hanger bracket 70 can include a seat 76 formed in a collar 78. The collar 78 can receive the hanger ball 18 via a side opening 79 to locate the hanger ball 18 within the seat 76.

Figure 2:
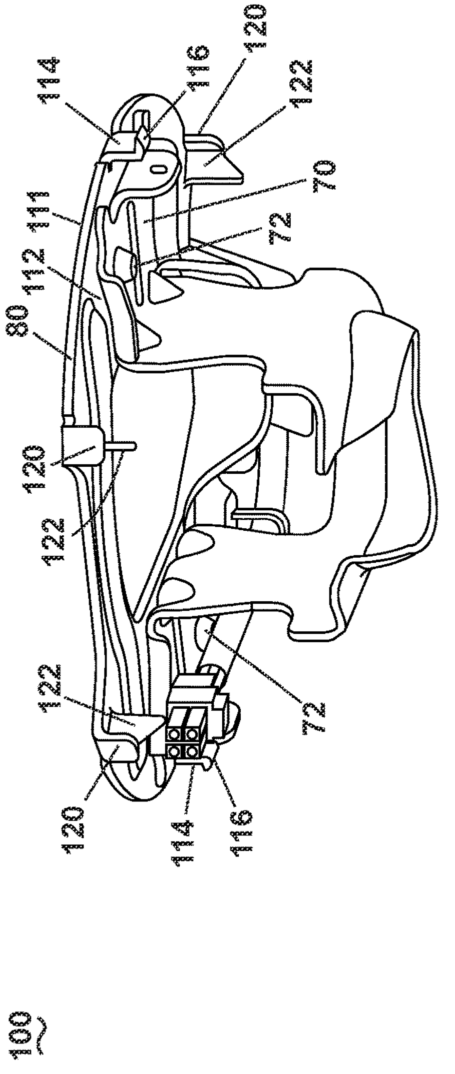
FIG. 2 is a front view of the ceiling fan mounting assembly of FIG. 1 with the canopy removed.
Figure 2A:
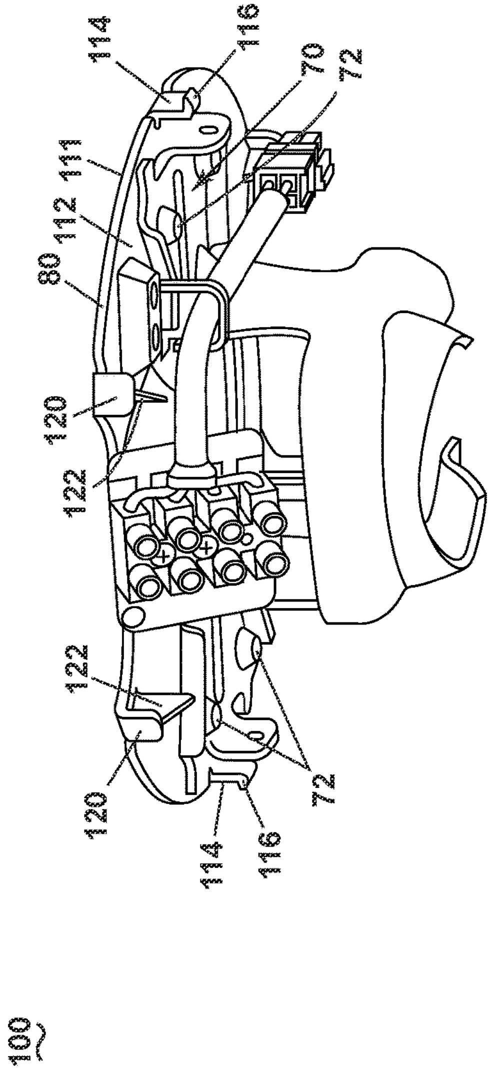
FIG. 2A is a rear view of the ceiling fan mounting assembly of FIG. 2.

FIGS. 2 and 2A illustrate a front and rear view of the mounting plate 80 and hanger bracket 70 of mounting assembly 100. Mounting plate 80 has a top surface 111 and a bottom surface 112, where the top surface 111 confronts the structure 12 and the bottom surface 112 confronts the hanger bracket 70 when assembled. At least one projection 114 extends downwardly from the mounting plate 80. The projection 114 can include a tang 116, which can extend laterally from the projection. Further extending downward from the periphery of the mounting plate 80 is a set of stabilizers 120. For additional strengthening, the stabilizers 120 may include adjoining gussets 122.

Figure 3:
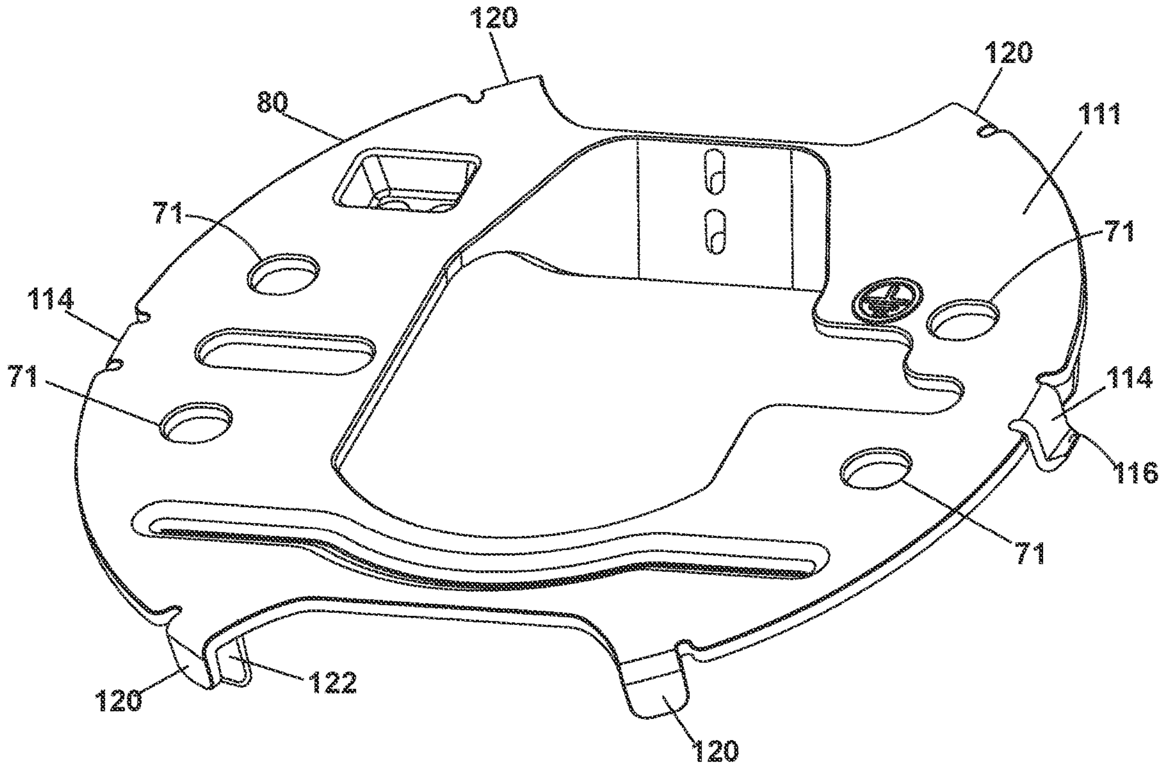
FIG. 3 is a top perspective view of a mounting plate included in the ceiling fan mounting assembly of FIGS. 2-2A.
Figure 3A:
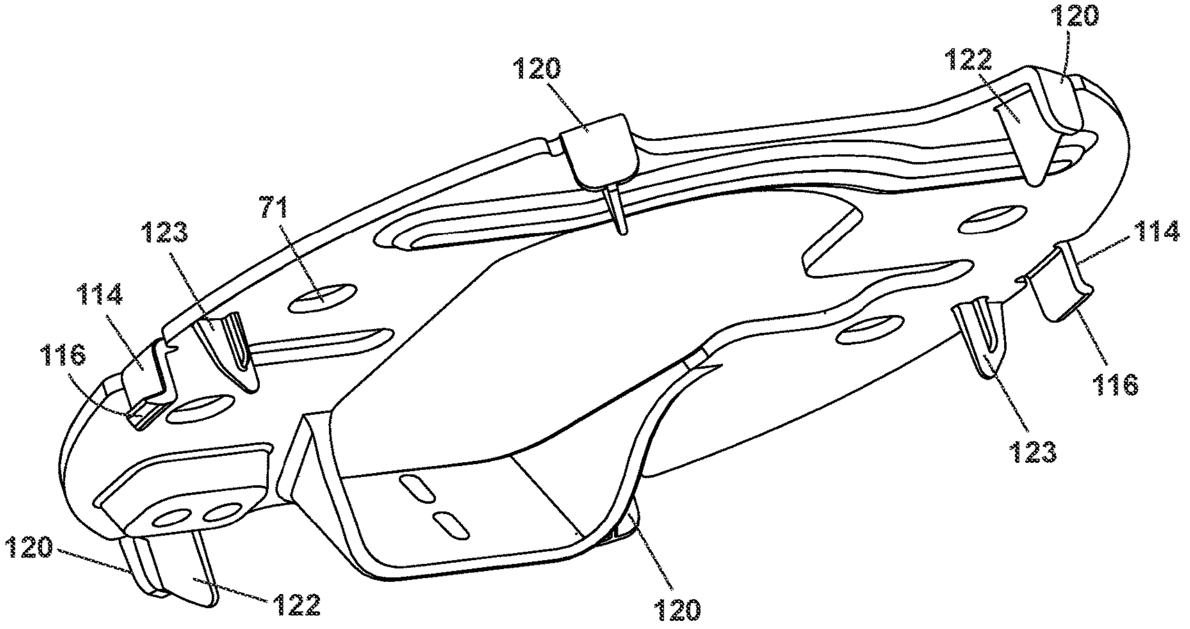
FIG. 3A is a is a bottom perspective view of the mounting plate of FIG. 3 with an arrangement of projections and support features.

FIGS. 3 and 3A illustrate the projections 114 can be arranged across the mounting plate 80 on opposite sides from one another, while variable positioning is contemplated, as well as more or less projections 114 than those shown. For example, stabilizers 120 can be arranged on the periphery of the plate 80, and can be positioned between the two projections 114. The mounting plate 80 may include additional supports 123 in the proximity of the projections 114. For example, the supports 123 can be within 1 inch (2.5 cm) of the projections 114. Alternative quantities, arrangements, and spacing distributions of stabilizers 120, supports 123, and projections 114 are contemplated. The mounting plate 80 and hanger bracket 70 further include apertures 71 for fasteners 72 for securing the mounting plate 80 to the hanger bracket 70.

Figure 4:
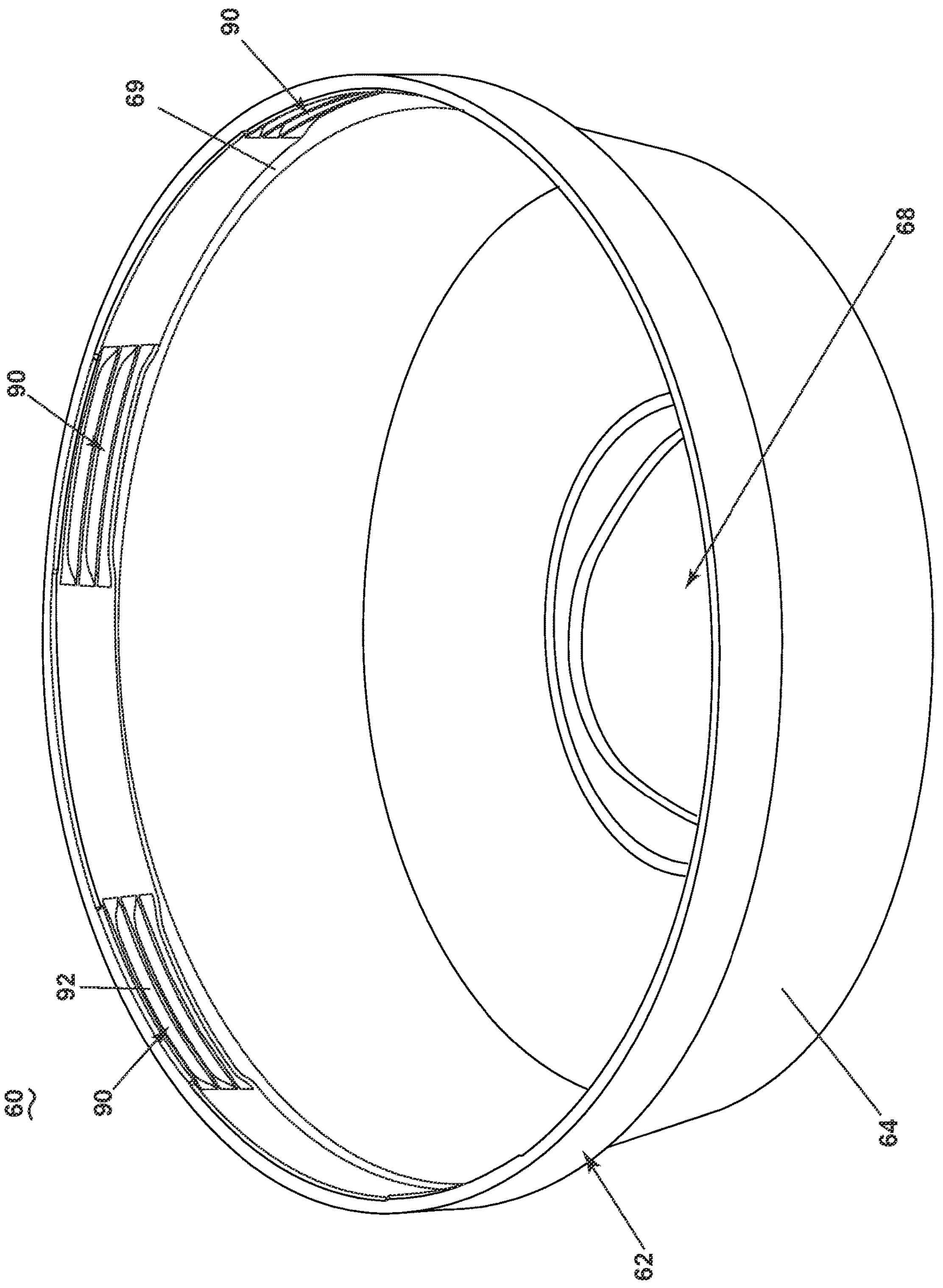
FIG. 4. is a top perspective view of the canopy of FIG. 1.

Referring now to FIG. 4, the canopy 60 comprises a body 64 with a rim 62 extending about one end of the body 64. A ledge 69 can be formed at the intersection of the rim 62 and the body 64. At least one detent array 90 comprising multiple detents 92 in a stacked arrangement is provided on the rim 62. The canopy 60 can include multiple detent arrays 90 arranged about the rim 62 such that the detent arrays 90 are spaced circumferentially. It is contemplated that the spacing of the detent arrays 90 can be equal or unequal. For example, the multiple pairs of detent arrays can be arranged in a diametrically opposed configuration around the rim. Furthermore, the number of detent arrays 90 can be equal to or different from the number of projections 114. Together with the projections 114, the detent arrays 90 comprise the variable height connector 110.

Overall the body 64 may be configured to substantially cover the mounting assembly 100 when assembled. The body 64 can further comprise a central opening 68. The central opening 68 slidably receives the downrod 16 during fan installation. The central opening 68 can be shaped to accommodate a trilobal hanger ball, while it is contemplated that the opening can be of any suitable shape to accommodate other common types of hanger ball or fan hanging assembly.

Figure 5:
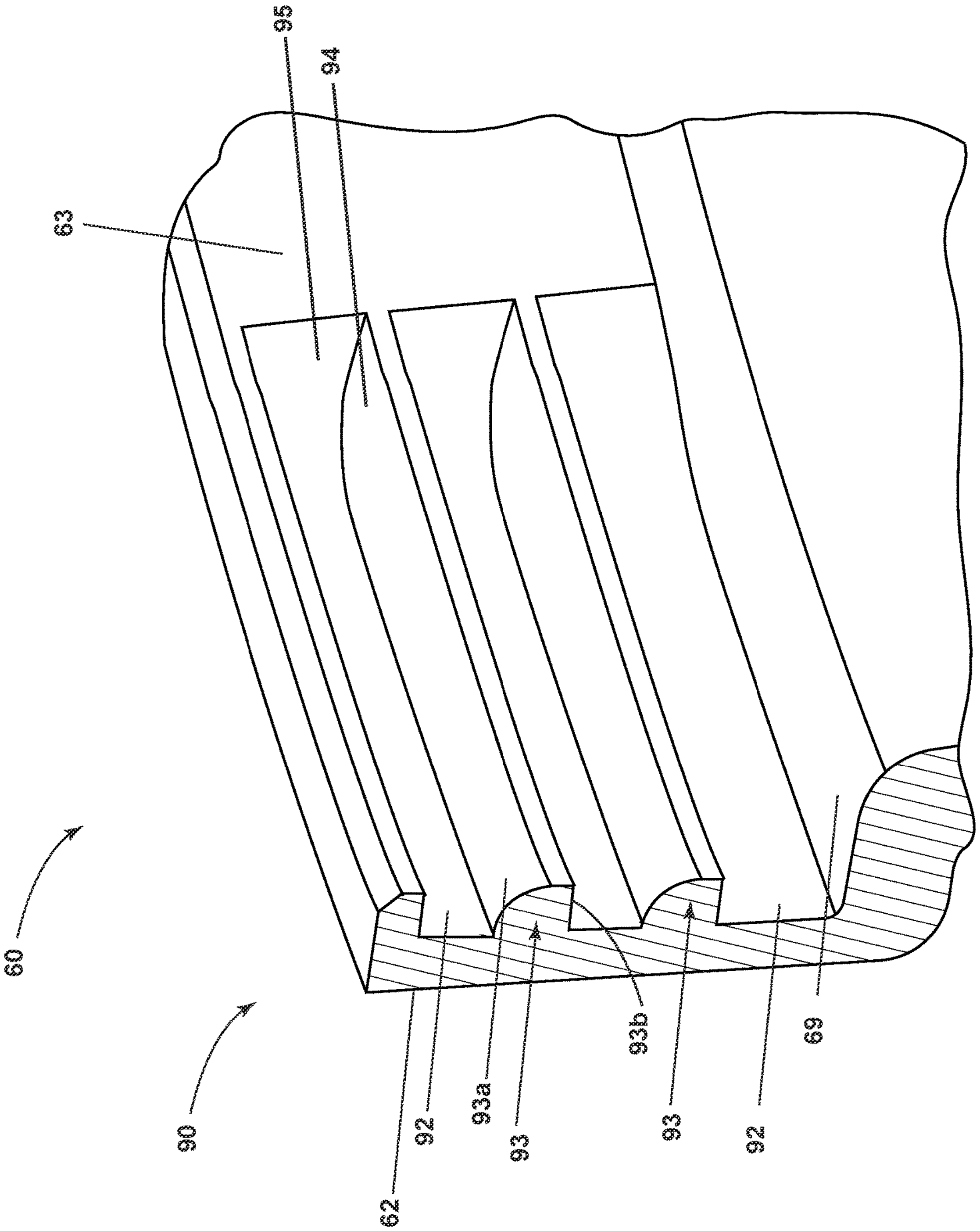
FIG. 5 is a perspective cross-section of a detent array provided in the canopy of FIG. 4.

FIG. 5 illustrates the form of the detent array 90 having multiple detents 92. The detents are illustrated as being inset into a surface 63 of the rim 62. However, other arrangements are contemplated, including the detents 92 extending away from the surface of the rim 62, instead of being inset within the surface 63. The detents 92 can have any shape. For ease of snap-fitting and securing, a rounded step 93 having a sloped upper side 93*a* may be included between each detent 92, which improves the ease of insertion of the projection 114 as it will ease deflection of the projection 114 during insertion. A flat underside 93*b* may be included in the rounded step 93, against which the tang 116 overlies after insertion, which will enhance the securing of the projection 114 within the detent array 90. The inner surface of the detent 92 curves outward and the detent 92 widens at the ends 95. Furthermore, the depth of detent 92 decreases to become shallower at the ends 95. The rounded steps 93 end in ramps 94 that slope smoothly towards the surface 63.

Figure 6:
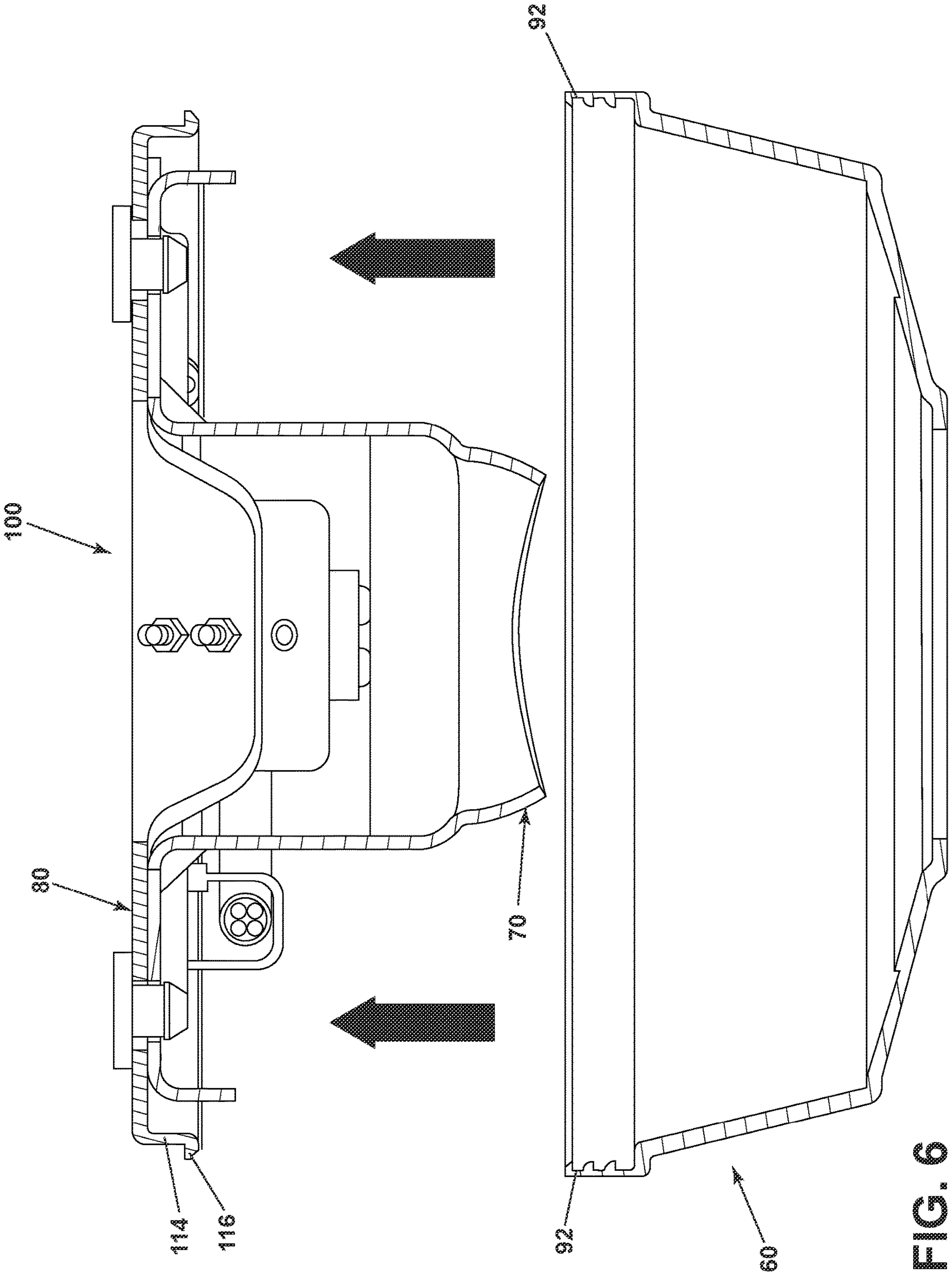
FIG. 6 is a scheme showing the direction of attachment of the canopy to the mounting brackets.

Turning to FIG. 6, the canopy 60 couples to mounting assembly 100 via the variable height connector 110. The rim 62 circumscribes the mounting plate 80 and the hanger bracket 70. When assembled, the variable height connector 110 is engaged when the projections 114 are caught in the detents 92.

To engage the variable height connector 110, canopy 60 and mounting plate 80 are pressed together in a linear motion as illustrated in FIG. 6. The user can initially connect the projection 114 into the top-most detent 92, inherent to the push-type connection. In this motion, the curved outer surface of tang 116 slides over the curved top surface of the rounded step 93 and the projection 114 is deflected until the flat top portion of the tang 116 catches and the tang 116 is received in the detent 92. The flat underside of the rounded step 93 provides a ratcheting feature, such that the tang 116 is hooked and held in place within the detent 92. The projection 114 can then advance to the next detent 92 and held at that position. The holding strength between the projection and the detent is sufficient to resist to most anticipated applications of force. An audible noise, such as a click or snap, can result during connection of the tangs 116 in the detents 92. Such a noise can let the user know that the variable height connector 110 has been engaged. The user can then evaluate as to whether the desired fit of the canopy 60 to the structure 12 has been achieved. If not, the variable height connector 110 can be advanced to another level of detent 92 level at one or more of the detent arrays 90 by pushing the mounting assembly 100 further into the canopy 60.

To disengage the variable height connector 110, the canopy 60 is rotated. During rotation, the tangs 116 slide along the ramp 94 and the curved inner surface of the detent 92. As the tangs 116 move to shallower ends 95 of detents 92, the projections 114 are deflected during the rotation. The tangs 116 are pressed outward by the ramps 94 and the curved surfaces at shallow ends 95. Thus the combined interactions of the ramps 94 and shallow ends 95 with tangs 116 cause the tangs 116 to leave the detent 92 at the ends 95, allowing the canopy 60 to be detached. Therefore, the canopy 60 may be disconnected by a rotational movement.

Additionally and alternatively, a single set of projection 114 and detent array 90 may be employed to connect the canopy 60 to the mounting assembly 100. The single set of projection 114 and detent array 90 may be used in combination with another securing mechanism. For example, a first portion of the canopy 60 may be pivotably connected to the mounting plate 80, such as by a hinge, e.g., a living hinge, between the mounting plate 80 and the canopy 60, where the single projection 114 and single detent array are located opposite the hinge. To engage the variable height connector 110 in this case, the canopy 60 can be pivoted about the living hinge such that projection 114 approaches detent array 90 and snaps in at any suitable detent 92.

Figure 7:
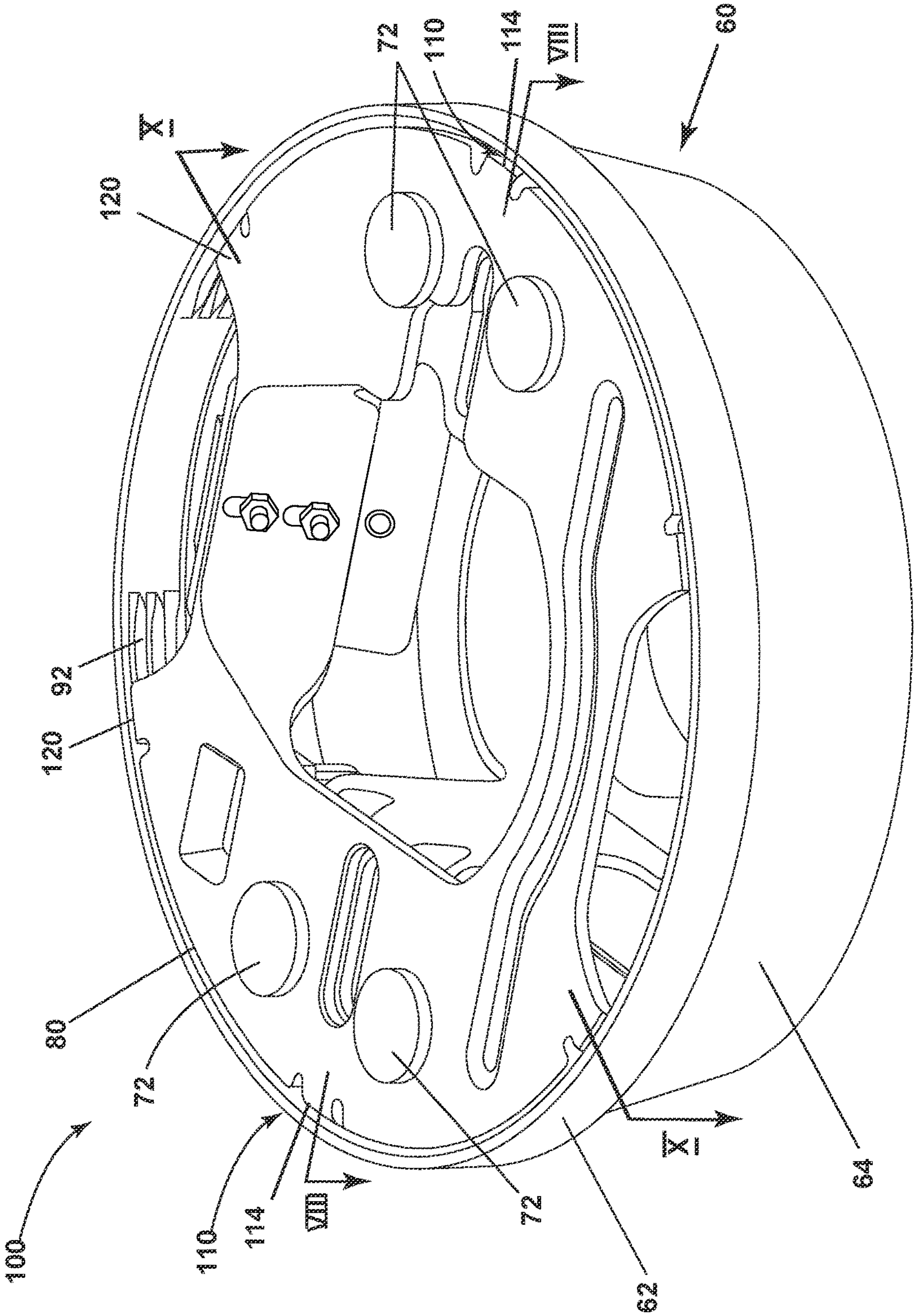
FIG. 7 a top perspective view of the mounting assembly of FIG. 2 secured with the canopy of FIG. 4.

FIG. 7 shows the canopy 60 and mounting assembly 100 in an assembled configuration. In this non-limiting example, the mounting plate 80 is surrounded by the rim 62 and the variable height connector 110, stabilizers 120, and supports 123 may be contained within the canopy 60.

Figure 8:
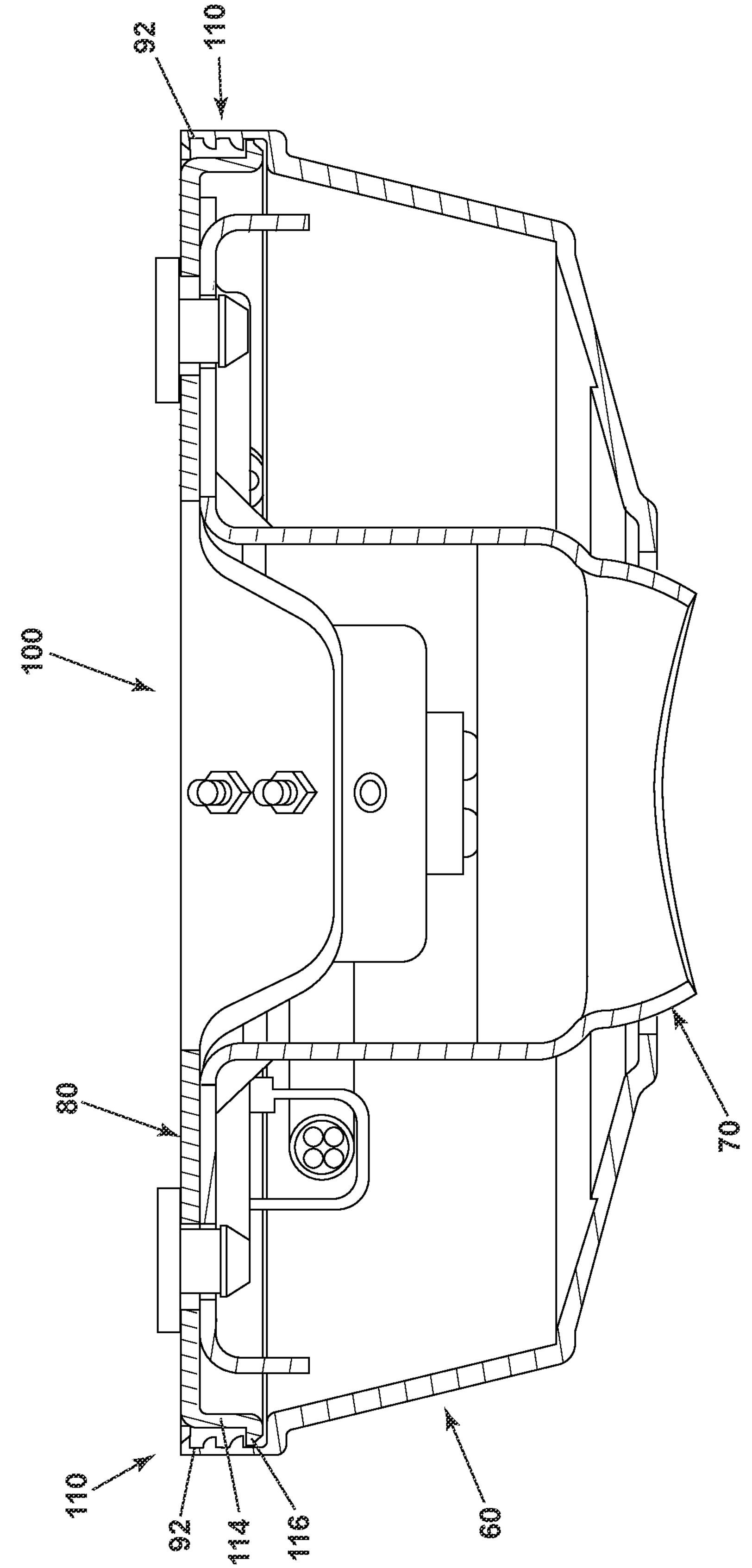
FIG. 8 is a cross-sectional view of the mounting assembly of FIG. 7 taken across section VIII-VIII.

Referring to FIG. 8, when the canopy 60 is assembled with the mounting assembly 100, the variable height connector 110 is in an engaged position. The projections 114 engage the detent arrays 90 such that each of the tangs 116 are received within one detent 92 of the array 90. While the projections 114 are shown as part of the mounting plate 80 and the detent arrays 90 are shown in the canopy 60, it is contemplated that the projections 114 can be part of the canopy 60 and the detent arrays 90 can be part of the mounting plate 80. It is even further contemplated that the detent arrays 90 or projections 114 can be provided on the hanger bracket 70, while the other is provided on the canopy 60. Furthermore, while the number of detent levels is illustrated as three, it is contemplated that any suitable number of detent levels can be used to permit variation in the mount height.

Figure 9:
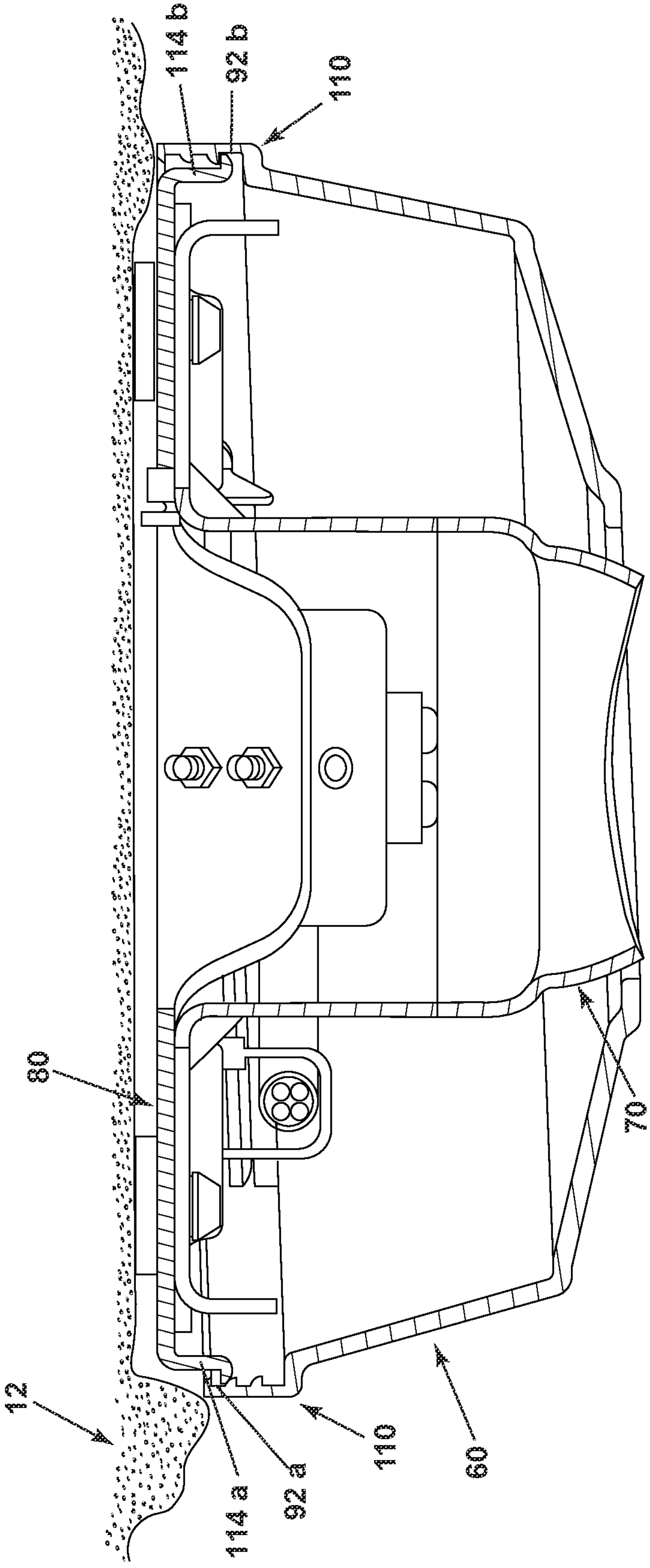
FIG. 9 is a cross-sectional view showing projections of FIG. 3A connected to the detent array of FIG. 5 at different heights among the canopy.

FIG. 9 further illustrates that projections 114 need not engage at the same corresponding level of detent 92. This arrangement is advantageous when the structure 12 is uneven and does not allow the top edge of the canopy 60 to abut the structure 12 at a uniform level. For example, if the structure 12 is a textured ceiling (e.g., a popcorn ceiling), the canopy 60 may encounter uneven raised features in structure 12 such that a fully flush mounting of the canopy 60 to the structure 12 is not possible. In this case, a first projection 114*a* can engage a first detent 92*a* in one of the detent arrays 90 while a second tang 114*b* engages a second detent 92*b* in another of the detent arrays 90. Because multiple detent arrays 90 can be spaced circumferentially about the rim 62 and because the number of detent arrays may be greater than the number of projections 114, the variable height connector 110 can be engaged in any one of multiple rotationally related configurations as selected by the user.

Figure 10:
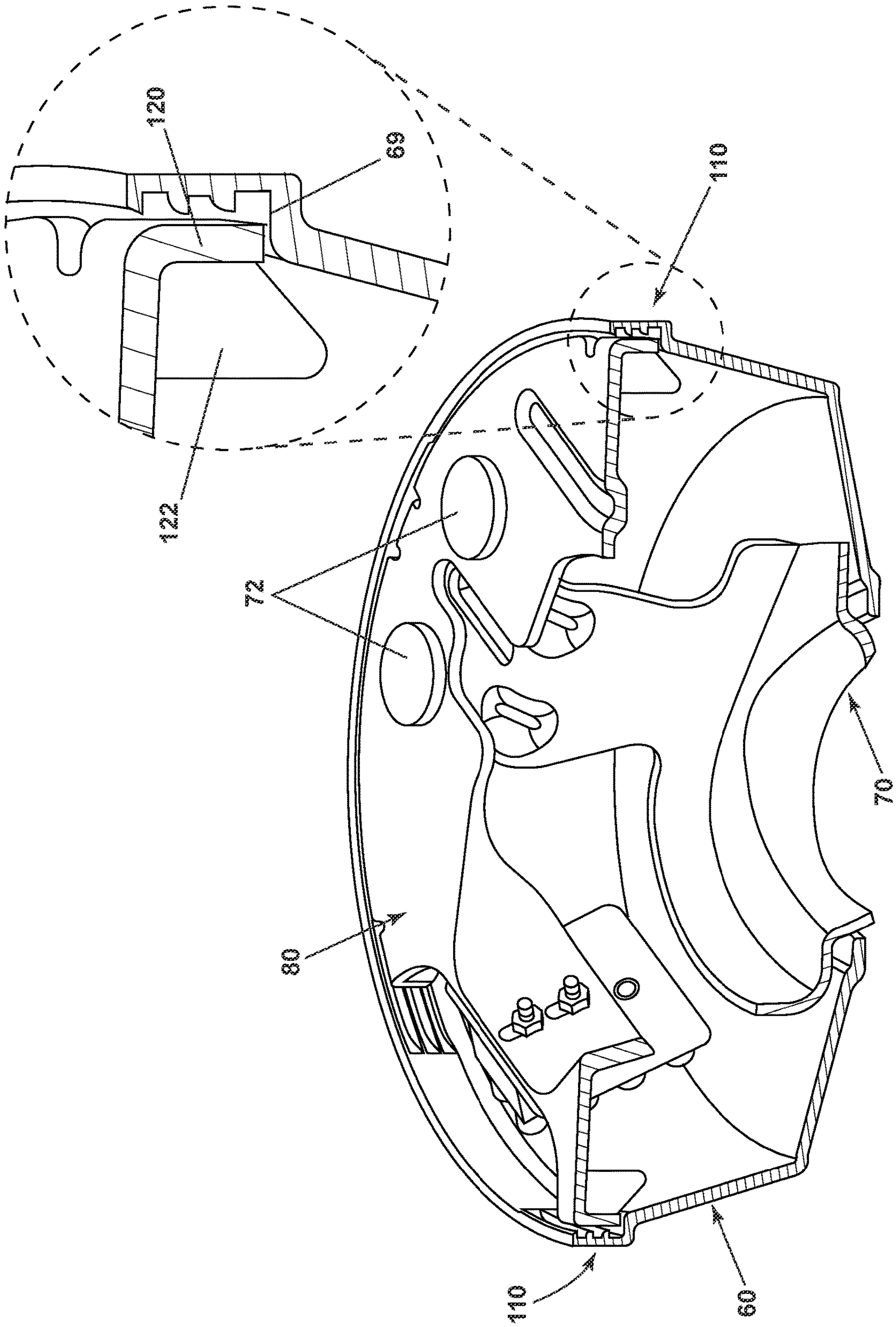
FIG. 10 is a cross-sectional view of the assembly of FIG. 7, taken along section X-X, and including an enlarged portion showing the supportive interaction between the stabilizer and canopy.

Referring now to FIG. 10, the stabilizers 120 rest on the ledge 69 (see inset of FIG. 10). The gussets 122 may be provided adjacent to the stabilizers 120 to reinforce the stabilizers 120, preventing them from bending inward. In this configuration, the stabilizers 120 and gussets 122 along with supports 123 provide stabilizing forces that counteract vibrations and rocking that may occur when the ceiling fan is in operation. Furthermore, the gussets 122 help the user avert a misconfiguration where the stabilizer 120 is outside the rim 62 of the canopy 60 during installation. Supports 123 further serve to brace the mounting assembly 100 against shaking during operation of ceiling fan 10.

Further aspects of the invention are provided by the subject matter of the following clauses:

A mounting system for mounting a ceiling fan assembly to a mount surface, the mounting system comprising: a bracket configured to be mounted to the mount surface; a canopy having a rim; a variable height connector, coupling the canopy to the bracket, comprising: at least one detent array, located on one of the bracket or canopy, the detent array having multiple detents in stacked arrangement, and at least one projection, extending from the other of the bracket or canopy, and receivable within any of the multiple detents.

The mounting system of any preceding clause, wherein the at least one detent array comprises multiple detent arrays.

The mounting system of any preceding clause, wherein the multiple detent arrays are spaced circumferentially about one of the bracket or rim.

The mounting system of any preceding clause, wherein the multiple detent arrays are spaced circumferentially evenly about the one of the bracket or rim.

The mounting system of any preceding clause, wherein at least two of the multiple detent arrays are spaced diametrically about the one of the bracket or rim.

The mounting system of any preceding clause, wherein the number of detent arrays of the multiple detent arrays is greater than the number of projections of the at least one projection.

The mounting system of any preceding clause, wherein the bracket includes at least one stabilizer extending from one of the bracket or rim.

The mounting system of any preceding clause, wherein the at least one stabilizer abuts the other of the bracket or rim.

The mounting system of any preceding clause, wherein the at least one stabilizer comprises multiple spaced stabilizers.

The mounting system of any preceding clause, wherein the at least one stabilizer includes at least one gusset.

A canopy mounting system for mounting a ceiling fan comprising: a bracket assembly for mounting the ceiling fan to a mount surface; a canopy coupled to and covering the bracket; a variable height connector, coupling the canopy to the bracket, comprising: a detent array located on the canopy, and a projection extending from the bracket, received by the detent array.

The canopy mounting system of any preceding clause wherein the bracket assembly further comprises a mount plate and a hanger bracket.

The canopy mounting system of any preceding clause wherein the projection extends from the mount plate.

The canopy mounting system of any preceding clause wherein the detent array includes a set of three vertically stacked detents.

The canopy mounting system of any preceding clause wherein the canopy includes a rim defining a ledge.

The canopy mounting system of any preceding clause wherein the bracket assembly includes a stabilizer that rests on the ledge.

The canopy mounting system of any preceding clause wherein the stabilizer further includes a gusset.

A method of mounting a canopy to a mounting bracket, the method comprising: pushing a canopy to position about the periphery of the mounting bracket to secure the canopy to the mounting bracket; wherein the canopy includes a detent array, and the mounting bracket includes a projection received within one detent of the detent array when the canopy is pushed about the periphery of the mounting bracket.

The method of any preceding clause further comprising pushing the canopy further such that the projection is moved to a different detent within the detent array.

The method of any preceding clause, wherein the canopy further includes multiple detent arrays and the mounting bracket includes multiple projections, and wherein pushing the canopy further includes receiving one projection of the multiple projections in one detent array of the multiple detent arrays at a different height than another one projection of the multiple projections in another one detent array of the multiple detent arrays.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mounting system for mounting a ceiling fan assembly to a mount surface, the ceiling fan assembly having a motor housing and a downrod connected to the motor housing, the mounting system comprising:

a mounting assembly comprising a mounting plate with hanger bracket configured to be mounted to the mount surface and the hanger bracket having a downrod seat receiving the downrod to suspend the motor housing from the hanger bracket;

a canopy having a rim and an opening through which the downrod passes;

a variable height connector, coupling the canopy to the mounting assembly, comprising:

at least one detent array, located on one of the mounting assembly or canopy, the detent array having multiple detents in stacked arrangement, and at least one projection, extending from the other of the mounting assembly or canopy, and receivable within any of the multiple detents.

2. The mounting system of claim 1, wherein the at least one detent array comprises multiple detent arrays.

3. The mounting system of claim 2, wherein the multiple detent arrays are spaced circumferentially about one of the mounting assembly or rim.

4. The mounting system of claim 2, wherein the multiple detent arrays are spaced circumferentially evenly about the one of the mounting assembly or rim.

5. The mounting system of claim 2, wherein at least two of the multiple detent arrays are spaced diametrically about the one of the mounting assembly or rim.

6. The mounting system of claim 2, wherein the number of detent arrays of the multiple detent arrays is greater than the number of projections of the at least one projection.

7. The mounting system of claim 1, wherein the bracket includes at least one stabilizer extending from one of the bracket or rim.

8. The mounting system of claim 7, wherein the at least one stabilizer abuts the other of the bracket or rim.

9. The mounting system of claim 8, wherein the at least one stabilizer comprises multiple spaced stabilizers.

10. The mounting system of claim 8, wherein the at least one stabilizer includes at least one gusset.

11. A ceiling fan assembly comprising:

a motor housing;

a downrod connected to the motor housing;

a mounting assembly comprising a mounting plate with a hanger bracket for mounting the downrod to a mount surface;

a canopy having an opening through which the downrod passes and coupled to and covering the bracket;

a variable height connector, coupling the canopy to the mounting assembly, comprising:

a detent array located on the canopy, and a projection extending from the mounting assembly, received by the detent array.

12. The ceiling fan assembly comprising of claim 11 wherein the projection extends from the mount plate.

13. The ceiling fan assembly comprising of claim 11 wherein the detent array includes a set of three vertically stacked detents.

14. The ceiling fan assembly comprising of claim 11 wherein the canopy includes a rim defining a ledge.

15. The ceiling fan assembly comprising of claim 14 wherein the mounting assembly includes a stabilizer that rests on the ledge.

16. The ceiling fan assembly comprising of claim 15 wherein the stabilizer further includes a gusset.

* * * * *